US005813969A

United States Patent [19]
Eto et al.

[11] Patent Number: 5,813,969

[45] Date of Patent: Sep. 29, 1998

[54] PROCESS FOR DETOXICATING NOXIOUS WASTES

[76] Inventors: Toyohisa Eto, 10, Kitaminecho 3-chome, Oota-ku, Tokyo 145; Masao Sugihara, 101, Fuyo House, 12-12, Minamiazabu 5-chome, Minato-ku, Tokyo 106, both of Japan

[21] Appl. No.: 954,203

[22] Filed: Oct. 20, 1997

Related U.S. Application Data

[62] Division of Ser. No. 760,421, Dec. 4, 1996, Pat. No. 5,714,085.

[30] Foreign Application Priority Data

Jul. 10, 1996 [JP] Japan .................................... 8-199617

[51] Int. Cl.$^{6}$ ................................ A62D 3/00; B09B 3/00

[52] U.S. Cl. .......................... 588/257; 210/909; 210/912; 588/207; 588/224; 588/252; 588/256

[58] Field of Search .................................... 588/206, 207, 588/224, 236, 252, 256, 257, 901; 106/719; 210/901, 908, 909, 912, 913, 914; 405/128, 129

[56] References Cited

U.S. PATENT DOCUMENTS

| | | | |
|---|---|---|---|
| 3,963,637 | 6/1976 | Chappell | 588/901 X |
| 4,132,558 | 1/1979 | Uchikawa et al. | 588/257 |
| 4,209,335 | 6/1980 | Katayama et al. | 588/252 |
| 5,630,785 | 5/1997 | Pridemore et al. | 588/255 |

*Primary Examiner*—George A. Suchfield
*Attorney, Agent, or Firm*—Armstrong, Westerman, Hattori, McLeland & Naughton

[57] ABSTRACT

Noxious wastes are detoxicated by admixing a detoxicating agent to noxious wastes containing heavy metals, PCB, or the like and eliminating noxious materials in the wastes, in which the detoxicating agent comprises sodium, potassium, calcium, lithium, barium, magnesium, strontium, cobalt or nickel, copper and zinc contained in an ionic state to a diluted aqueous solution comprising tannin and pyroligneous acid as the main ingredient. Further, the detoxicating agent is admixed together with cement to the noxious wastes containing heavy metals, PCB or the like, thereby eliminating noxious substances in the wastes and solidifying them.

4 Claims, No Drawings

PROCESS FOR DETOXICATING NOXIOUS WASTES

This is a divisional of application Ser. No. 08/760,421 filed Dec. 4, 1996, now U.S. Pat. No. 5,714,085.

BACKGROUND OF THE INVENTION

1. Field of the Invention

The present invention concerns a process for detoxicating noxious wastes which contain materials put under legal regulation as industrial wastes such as noxious or toxic heavy metals and PCB, as well as a detoxicating agent used for the process.

2. Description of the Prior Art

Not reusable wastes such as usual dusts, sewage sludges and industrial wastes have been incinerated in usual disposing factories for reducing their volume and weight. However, since wastes of this kind sometimes contain heavy metals and PCB (polybiphenylchloride) that give various undesired effects on human livings and animals such as sterility, immunodeficiency and teratogenesis, it has been demanded for such a processing as not deteriorating natural environments.

Wastes containing heavy metals such as lead and cadmium have been treated so far by discarding incinerated ashes after incineration as they are to controlled-type disposal sites or subjecting them to solidifying treatment in admixture with cement.

However, if they are discharged in the form of incinerated ashes as they are, they bring about a public pollution such as contamination of ground water. Further, the cement-solidification method can provide a primary effect for preventing environmental pollution to some extent. However, voids are liable to be formed in solidification products depending on the way of formulating or curing concretes, to allow easy permeation of gases or liquids and, as a result, degradation would occur due to physical and chemical reactions such as salt damage or neutralization during long times. Particularly, it has been pointed out a risk that materials causing public pollution contained in the solidified products are leached by acidic rainfall, leading to environmental contamination.

Further, although there have been made various studies for detoxicating PCB-containing solutions, there remain still various problems and no satisfactory processing method has yet been established.

OBJECT OF THE INVENTION

Accordingly, it is a first object of the present invention to provide a process for detoxicating materials causing public pollution by eliminating heavy metals or PCB in noxious wastes.

A second object of the present invention is to provide a process for detoxicating materials causing public pollution by detoxicating noxious wastes containing heavy metals or PCB and solidifying them in the form of reusable solidification products and storing them in a stable inoxious state for a long period of time.

A third object of the present invention is to provide a processing agent used for the process for detoxicating materials causing public pollution.

SUMMARY OF THE INVENTION

The foregoing objects can be attained by a process according to the present invention by ad mixing a detoxicating agent to noxious wastes containing heavy metals, PCB or the like and eliminating noxious materials in the wastes, in which the detoxicating agent comprises sodium, potassium, calcium, lithium, barium, magnesium, strontium, cobalt or nickel, copper and zinc contained in an ionic state to a diluted aqueous solution comprising tannin and pyroligneous acid as the main ingredient.

The second object of the present invention can be attained by the process according to the present invention by admixing a detoxicating agent to noxious wastes containing heavy metals, PCB or the like and eliminating noxious materials in the wastes, as well as solidifying them, in which the detoxicating agent comprises sodium, potassium, calcium, lithium, barium, magnesium, strontium, cobalt or nickel, copper and zinc contained in an ionic state to a diluted aqueous solution comprising tannin and pyrolignous acid as the main ingredient.

In any of the cases described above, additives formed by incorporating sodium, potassium, calcium, lithium, barium, magnesium, strontium, cobalt or nickel, copper and zinc in an ionic state to a diluted aqueous solution containing tannin and pyrolignous acid as a main ingredient is used as the detoxicating agent.

The toxicating additive can be obtained by dissolving sodium chloride, potassium chloride, potassium bromide, calcium sulfate, lithium chloride, barium chloride, magnesium chloride, strontium chloride, cobalt chloride or nickel chloride, copper chloride and zinc chloride into a diluted aqueous solution containing tannin and pyrolignous acid as the main ingredient.

A blending ratio for the ingredients of the detoxicating agent is preferably from 41.7 to 83.3 g of sodium chloride, 83.6 to 125.3 g of potassium chloride, 6 to 9 g of potassium bromide, 8 to 12 g of calcium sulfate, 1.6 to 2.4 g of lithium chloride, 12 to 18 g of barium chloride, 8 to 12 g of magnesium chloride, 4 to 6 g of strontium chloride, 8 to 12 g of cobalt chloride or nickel chloride, 3 to 6 g of copper chloride and 3 to 6 g of zinc chloride dissolved in one liter of a diluted aqueous solution comprising tannin and pyrolignous acid as the main ingredient.

One of the process for detoxicating materials put under legal regulation as industrial wastes in toxic or noxious wastes (hereinafter referred to as public pollution-causing materials) according to the present invention is conducted by mixing a predetermined detoxicating agent to wastes containing noxious materials such as heavy metals or PCB, for example, usual dusts, sewage sludges, industrial wastes and incineration ashes left after incineration of them.

The detoxicating agent used for the process comprises an aqueous solution formed by incorporating sodium, potassium, calcium, lithium, barium, magnesium, strontium, cobalt or nickel, copper and zinc in an ionic state into a diluted aqueous solution comprising, as the main ingredient, tannic acid and pyrolignous acid that can be obtained, for example, from flood woods.

The detoxicating agent can be formed by dissolving sodium chloride, potassium chloride, potassium bromide, calcium sulfate, lithium chloride, barium chloride, magnesium chloride, strontium chloride, cobalt chloride or nickel chloride, copper chloride and zinc chloride into a diluted aqueous solution comprising tannic acid and pyrolignous acid as the main ingredient.

Further, the mixing ratio of the ingredients is preferably from 41.7 to 83.3 g of sodium chloride, 83.6 to 125.3 g of potassium chloride, 6 to 9 g of potassium bromide, 8 to 12 g of calcium sulfate, 1.6 to 2.4 g of lithium chloride, 12 to 18 g of barium chloride, 8 to 12 g of magnesium chloride. 4 to 6 g of strontium chloride, 8 to 12 g of cobalt chloride or nickel chloride, 3 to 6 g of copper chloride and 3 to 6 g of zinc chloride dissolved in one liter of a diluted aqueous solution comprising tannin and pyrolignous acid as the main ingredient.

The detoxifying agent used in the present invention contains tannic acid and pyrolignous acid having a strong chelating effect to compounds of various elements.

Further, detoxicating agent has a property of causing chlorine substitution reaction and an effect of replacing chlorine atoms in PCB thereby eliminating PCB.

Further, the detoxicating agent has an effect of forming coordination compounds from transition elements.

In view of the above, when the detoxicating agent is mixed with noxious wastes containing heavy metals, PCB or the like, public pollution-causing materials in the wastes can be effectively detoxicated by the strong chelating reaction and chlorine substitution reaction and formation of coordination compounds from transition elements caused by the detoxicating agent.

Further, another method of detoxicating materials causing public pollution in the noxious wastes according to the present invention is practiced by mixing the predetermined detoxicating agent described above together with cement to usual dusts, sewage sludges, industrial, wastes, incinerated ashes left after incineration of them or a PCB solution and solidifying them.

In this case, since various kinds of inorganic chlorides are mixed in the detoxicating agent, when the agent is mixed together with portland cement to noxious materials such as sludges, deposits, incineration ashes, industrial wastes and PCB solutions and stirred under the presence of an appropriate water content, acicular crystals are formed due to anionic bondings simultaneously with hydrating reaction inherent to portland cement, so that they are changed and modified into crystal forms with no water content not obtainable by mere hydration of cement, in which organic and inorganic materials are bonded firmly and solidified.

The thus formed solidification products can be utilized as a material having high strength. Particularly, since the solidification products are formed by detoxicating and solidifying the noxious substances as described above, public pollution-causing material that contaminate environment are not leached out.

EXAMPLE

Examples of the present invention are shown below.

Examples of detoxicating public pollution-causing materials according to the present invention, and results of a test for PCB content and a leaching test specified in Environmental Agency Notification No. 13 for solidification products are shown below.

(Experimental Example 1)

The detoxicating agent according to the present invention was admixed by 6 vol % to a spindle oil containing 2% PCB (transformer oil). The liquid mixture, when stood still, was separated into two layers of an oil phase and an aqueous phase. PCB was measured for the oil phase and the aqueous phase.

As a result, the content of PCB was not more than 0.03 mmg/kg both for the oil phase and the aqueous phase, which was below a standard critical value relevant to industrial wastes. In view of the above, it is considered that the detoxicating agent according to the present invention causes substitution reaction with chlorine atoms in PCB thereby eliminating PCB present in the spindle oil.

(Experimental Example 2)

A demonstrating test for detoxicating and solidifying public pollution-causing materials for solidification products according to the present invention was conducted as below.

500 g of a mixture comprising 10 vol % of the detoxicating agent according to the present invention, 10 vol % of fly ash, 20 vol % of usual incineration ash, 10 vol % of residual liquid after excrement treatment, 20 vol % of sand and 30 vol % of cement were added to 500 ml of a solution in which 2% of PCB was added to spindle oil to form a solidification products. After curing the solidification products in air for 30 days, a leaching test for materials causing environmental pollution was conducted. The leaching test was conducted in accordance with the method specified in Environmental Agency Notification No. 13. The results are shown below.

Cadmium or compound thereof (Cd) less than 0.005 mg/l.

Cyan compound (CM) less than 0.001 mg/l.

Organic phosphorous compound (O—P) less than 0.1 mg/l.

Lead or compound thereof (PB) less than 0.02 mg/l.

Hexavalent chromium compound (Cr) less than 0.04 ml/l.

Arsenic or compound thereof (As) less than 0.01 mg/l.

Mercury or compound thereof (Hg) less than 0.0005 ml/l.

Alkyl mercury compound (R—Hg) less than 0.0005 mil/l.

PCB (PCB) less than 0.0005 ml/l.

As described above, the Judging criteria relevant to industrial waste containing metals or the like have been cleared and the effectiveness of the present invention has been confirmed also in this experiment.

The present invention can efficiently remove heavy metals and PCB contained in noxious wastes by the strong chelating reaction, chlorine substitution reaction and formation of coordination compounds from transition elements caused by the detoxicating agent, thereby attaining detoxication of public pollution-causing materials.

Accordingly, it is extremely useful for the prevention of environmental pollution.

Further, according to the present invention, since noxious wastes are mixed and stirred together with portland cement, stabilization and solidification can be attained to such a high hardness as not obtainable by mere hydration of cement, solidification products not leaching noxious materials and usable again can be obtained in addition to the detoxification of the noxious materials.

As described above, the present invention can provide advantageous effects of protecting natural environment of human beings, and plants and animals by preventing environmental pollution, as well as capable of contributing to the reuse of resources.

What is claimed is:

1. A process for detoxicating noxious wastes by admixing a detoxicating agent to noxious wastes containing heavy metals or PCB and eliminating noxious materials in the wastes, in which said detoxicating agent comprises sodium, potassium, calcium, lithium, barium, magnesium, strontium, cobalt or nickel, copper and zinc contained in an ionic state to a diluted aqueous solution of a liquid comprising tannin and pyrolignous acid as the main ingredient.

2. A process for detoxicating noxious wastes by admixing a detoxicating agent together with cement to noxious wastes containing heavy metals or PCB and eliminating noxious materials in the wastes, as well as solidifying them, in which said detoxicating agent comprises sodium, potassium, calcium, lithium, barium, magnesium, strontium, cobalt or nickel, copper and zinc contained in an ionic state to a diluted aqueous solution of a liquid comprising tannin and pyrolignous acid as the main ingredient.

3. A process for detoxicating noxious wastes as defined in claim 1 or 2, wherein the detoxicating agent is an aqueous solution formed by dissolving sodium chloride, potassium chloride, potassium bromide, calcium sulfate, lithium chloride, barium chloride, magnesium chloride, strontium chloride, cobalt chloride or nickel chloride, copper chloride and zinc chloride to a diluted aqueous solution comprising tannin and pyrolignous as the main ingredient.

4. A process for detoxicating noxious wastes as defined in claim 3, wherein the detoxicating agent is an aqueous solution formed by dissolving 41.7 to 83.8 g of sodium chloride, 83.6 to 125.3 g of potassium chloride, 6 to 9 g of potassium bromide, 8 to 12 g of calcium sulfate, 1.6 to 2.4 g of lithium chloride, 12 to 18 g of barium chloride, 8 to 12 g of magnesium chloride, 4 to 6 g of strontium chloride, 8 to 12 g of cobalt chloride or nickel chloride, 3 to 6 g of copper chloride and 3 to 6 g of zinc chloride into one liter of a diluted aqueous solution of a liquid comprising tannin and pyrolignous acid as the main ingredient.

* * * * *